(12) United States Patent
Kodama (10) Patent No.: US 9,087,547 B2
(45) Date of Patent: Jul. 21, 2015

(54) DISK DRIVE DEVICE WITH A FLOURESCENT LUBRICANT

(71) Applicant: SAMSUNG ELECTRO-MECHANICS JAPAN ADVANCED TECHNOLOGY CO., LTD., Fujieda, Shizuoka Prefecture (JP)

(72) Inventor: Mitsuo Kodama, Fujieda (JP)

(73) Assignee: SAMSUNG ELECTRO-MECHANICS JAPAN ADVANCED TECHNOLOGY CO., LTD., Fujieda, Shizuoka Prefecture (JP)

( * ) Notice: Subject to any disclaimer, the term of this patent is extended or adjusted under 35 U.S.C. 154(b) by 0 days.

(21) Appl. No.: 14/149,678

(22) Filed: Jan. 7, 2014

(65) Prior Publication Data

US 2014/0211343 A1 Jul. 31, 2014

(30) Foreign Application Priority Data

Jan. 29, 2013 (JP) .................................. 2013-013829

(51) Int. Cl.
| G11B 19/20 | (2006.01) |
| H02K 7/08 | (2006.01) |
| F16C 33/10 | (2006.01) |
| H02K 5/16 | (2006.01) |
| H02K 15/00 | (2006.01) |
| F16C 17/10 | (2006.01) |

(52) U.S. Cl.
CPC .......... *G11B 19/2036* (2013.01); *F16C 17/107* (2013.01); *H02K 5/163* (2013.01); *H02K 15/00* (2013.01); *F16C 33/109* (2013.01); *Y10T 29/49069* (2015.01)

(58) Field of Classification Search
USPC ................................ 360/99.08; 384/100, 107
See application file for complete search history.

(56) References Cited

U.S. PATENT DOCUMENTS

| 6,513,979 | B2 * | 2/2003 | Mori et al. ..................... 384/107 |
| 6,685,356 | B2 * | 2/2004 | Hirata ............................ 384/100 |
| 7,115,894 | B2 * | 10/2006 | Irmer et al. .................... 250/577 |
| 7,789,566 | B2 * | 9/2010 | Kobayashi et al. ........... 384/100 |
| 8,741,820 | B2 * | 6/2014 | Akao et al. .................... 508/110 |
| 8,786,982 | B1 * | 7/2014 | Kodama et al. ............ 360/99.08 |
| 2003/0144159 | A1 * | 7/2003 | Akiyama et al. .............. 508/462 |
| 2004/0132881 | A1 * | 7/2004 | Okamiya et al. .............. 524/284 |
| 2004/0262567 | A1 * | 12/2004 | Wilson ............................ 252/68 |
| 2010/0292111 | A1 * | 11/2010 | Villalobos Sandoval et al. ............................. 508/207 |
| 2011/0064341 | A1 * | 3/2011 | Mizuno et al. ................. 384/114 |
| 2012/0272667 | A1 * | 11/2012 | Ferraro et al. ..................... 62/77 |

(Continued)

FOREIGN PATENT DOCUMENTS

| JP | 2001065568 A | * | 3/2001 | ............. F16C 33/10 |
| JP | 2007-120653 A |  | 5/2007 |

(Continued)

OTHER PUBLICATIONS

Computer English translation of JP 2001-065568 to Higuichi; 8 pages.*

*Primary Examiner* — Brian Miller
(74) *Attorney, Agent, or Firm* — Holtz, Holtz, Goodman & Chick PC (57) ABSTRACT

A disk drive device includes a stationary body, a rotating body on which a recording disk is to be mounted, and a fluid bearing unit that supports the rotating body in a freely rotatable manner relative to the stationary body. The fluid bearing unit includes a lubricant that is fluorescent.

15 Claims, 4 Drawing Sheets

(56) References Cited

U.S. PATENT DOCUMENTS

2014/0304979 A1* 10/2014 Kodama et al. ............ 29/603.03
2014/0319777 A1* 10/2014 Sugiki et al. ................. 277/412
2014/0355155 A1* 12/2014 Kumaki .................... 360/99.12

FOREIGN PATENT DOCUMENTS

| JP | 2008172963 A | * | 7/2008 |
| JP | 2008-275047 A | | 11/2008 |
| JP | 2010-262580 A | | 11/2010 |

* cited by examiner

DISK DRIVE DEVICE WITH A FLOURESCENT LUBRICANT

BACKGROUND OF THE INVENTION

1. Field of the Invention

The present invention relates to a disk drive device having a fluid dynamic bearing unit and a manufacturing method of the same.

2. Description of the Related Art

Disk drive devices like a hard disk drive often employ a fluid dynamic bearing unit that enables a stable and fast-speed rotation. For example, according to a motor disclosed in JP 2008-275047 A and having a dynamic pressure bearing, a lubricant is applied between a sleeve that is a part of a stator and a shaft that is a part of a rotor. The rotor is supported in a non-contact manner by dynamic pressure generated in the lubricant, enabling a smooth and fast-speed rotation.

Conversely, there is a demand for disk drive devices to further increase the memory capacity. An example technique to cope with such a demand is to increase a recording density.

A gap between a recording/playing head and a disk surface may be reduced to increase the recording density. When such a gap is narrow, however, it becomes difficult for the recording/playing head to precisely trace the track on the disk surface when even a tiny particle sticks to the disk surface, resulting in a read/write error. In the worst case, the recording/playing head is damaged, and the disk drive device breaks down.

One of the causes of such particles is that the lubricant is excessively applied in the fluid dynamic bearing unit, and the excessive lubricant is splashed together with a fast-speed rotation of the fluid dynamic bearing unit. The splashed lubricant diffuses the interior of the disk drive device, and may build up condensation on the disk surface, thereby being deposited thereon. Conversely, when the lubricant applied in the fluid dynamic bearing unit is insufficient, the lubrication operation for the fluid dynamic bearing unit becomes insufficient, resulting in a break-down in the worst case.

That is, it is necessary to manage the lubricant applied in the fluid dynamic bearing unit to be an appropriate amount. JP 2010-262580 A discloses an example method of inspecting an amount of the lubricant applied in the fluid dynamic bearing unit.

The present invention has been made in view of the aforementioned circumstances, and it is an objective of the present invention to provide a disk drive device that facilitates a management of a lubricant applied in the a fluid dynamic bearing unit.

SUMMARY OF THE INVENTION

To accomplish the above objective, a first aspect of the present invention provides a disk drive device including: a stationary body; a rotating body including a disk mount part on which a recording disk is to be mounted; a lubricant that is fluorescent and is applied between the stationary body and the rotating body; and a gas-liquid interface contact part that is provided in at least either one of the stationary body and the rotating body, and contacts a gas-liquid interface of the lubricant.

To accomplish the above objective, a second aspect of the present invention provides a manufacturing method of a disk drive device that comprises a stationary body, a rotating body including a disk mount part on which a recording disk is to be mounted, a lubricant that is fluorescent and is applied between the stationary body and the rotating body, and a gas-liquid interface contact part that is provided in at least either one of the stationary body and the rotating body, and contacts a gas-liquid interface of the lubricant, the manufacturing method comprising a step for: emitting predetermined input light to at least a part of the disk drive device, and inspecting output light which is emitted in accordance with the input light and which has a different wavelength from a wavelength of the input light.

To accomplish the above objective, a third aspect of the present invention provides a manufacturing method of a disk drive device including a fluid bearing unit to which a lubricant is applied, the manufacturing method includes: adding a luminous substance to the lubricant at a rate of 0.001 to 1 mass %; applying the lubricant in the fluid bearing unit; and emitting input light with a predetermined wavelength to the fluid bearing unit in a dark room.

According to the present invention, there is provided a disk drive device which facilitates a management of a lubricant applied in a fluid dynamic bearing unit.

DETAILED DESCRIPTION OF THE PREFERRED EMBODIMENTS

A preferred embodiment of the present invention will be explained below with reference to the accompanying drawings. The same or equivalent structural element and component illustrated in the respective figures will be denoted by the same reference numeral, and the duplicated explanation will be omitted accordingly. The dimension of component in each figure is enlarged or scaled down as needed to facilitate understanding to the present invention. In addition, a part of a component not important to explain the embodiment in each figure will be displayed in an omitted manner.

A disk drive device according to the embodiment is suitably applied as a disk drive device like a hard disk drive which has a magnetic recording disk that magnetically records data, and which rotates and drives such a disk. For example, this disk drive device includes a rotating body that is attached to a stationary body in a freely rotatable manner via a bearing. The rotating body includes a loader that can load thereon a drive-target media like a magnetic recording disk. The bearing includes, for example, a radial bearing and a thrust bearing. As an example, the thrust bearing is located outwardly in the radial direction with respect to the radial bearing. The radial bearing and the thrust bearing may be each a fluid bearing that generates dynamic pressure to a lubrication medium present between a shaft body and a bearing body. Still further, this disk drive device includes a rotating driver that applies rotation torque to the rotating body. This rotating driver is, for example, a brush-less spindle motor. This rotating driver includes, for example, coils and a magnet.

Embodiment

Figure 1:
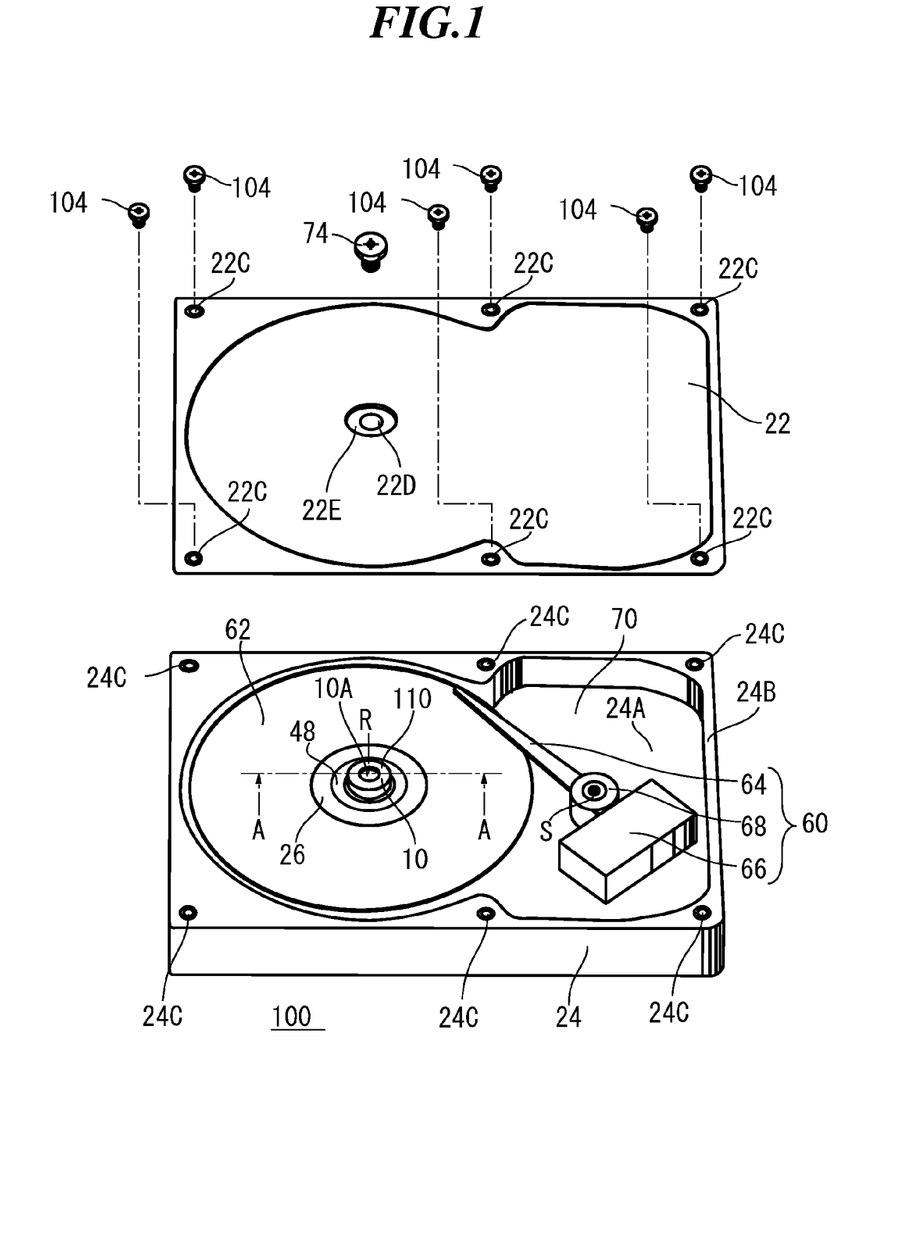
FIG. 1 is an exploded perspective view illustrating a disk drive device according to an embodiment of the present invention.

FIG. 1 is a perspective view illustrating a disk drive device 100 according to this embodiment. FIG. 1 illustrates a condition in which a top cover 22 is detached in order to facilitate understanding to the present invention. Components not important to explain this embodiment, such as a clamper and an electronic circuit, are omitted in FIG. 1. The disk drive device 100 includes a chassis 24, a shaft 110, a hub 26, magnetic recording disks 62, a data reader/writer 60, the top cover 22, a center screw 74, and for example, six peripheral screws 104.

In the following explanation, a side at which the hub 26 is mounted relative to the chassis 24 will be defined as an upper side. In addition, a direction along a rotation axis R of the rotating body, an arbitrary direction passing through the rotation axis R on a plane perpendicular to the rotation axis R, and an arbitrary direction on such a plane will be defined as an axial direction, a radial direction, and a planar direction, respectively. The notations of such directions are not to limit the posture of the disk drive device 100 when in use, and the disk drive device 100 can be used in any arbitrary posture.

The magnetic recording disk 62 is, for example, a 2.5-inch magnetic recording disk having a diameter of 65 mm and formed of a glass, and, a diameter of a center hole thereof is 20 mm. If the magnetic recording disk 62 is made thin, the rigidity thereof decreases, and is warped when polished at the time of the manufacturing of the disk drive device 100, thereby reducing the processing flatness. Conversely, if the magnetic recording disk 62 is made thick, the weight increases. Regarding the magnetic recording disk 62, it is proven that if the thickness is within a range at least from 0.5 mm to 1.25 mm, the rigidity and the weight are practical. In this embodiment, the magnetic recording disk 62 has a thickness of from 0.7 mm to 0.9 mm, which suppresses a decrease of the processing flatness, thereby suppressing a reduction of the recording density. For example, four magnetic recording disks 62 are to be mounted on the hub 26, and are rotated together with the rotation of the hub 26. As will be discussed later, the magnetic recording disks 62 are fastened to the hub 26 by spacers 72 and a clamper 72.

The chassis 24 includes a bottom plate 24A that forms the bottom of the disk drive device 100, and an outer circumference wall 24B formed along the outer periphery of the bottom plate 24A so as to surround an area where the magnetic recording disks 62 are to be mounted. For example, six screw holes 24C are provided in the top face of the outer circumference wall 24B. Note that the chassis may be referred to as a base in some cases.

The data reader/writer 60 includes an unillustrated recording/playing head, a swing arm 64, a voice coil motor 66, and a pivot assembly 68. The recoding/playing head is attached to the tip of the swing arm 64, records data in the magnetic recording disk 62, or reads the data therefrom. The pivot assembly 68 supports the swing arm 64 in a swingable manner to the chassis 24 around a head rotating shaft S. The voice coil motor 66 allows the swing arm 64 to swing around the head rotating shaft S to move the recording/playing head to a desired location over the top face of the magnetic recording disk 62. The voice coil motor 66 and the pivot assembly 68 are configured by a conventionally well-known technology of controlling the position of a head.

The top cover 22 is a thin plate formed in a substantially rectangular shape, and has, for example, six screw through-holes 22C provided at the periphery of the top cover 22, a cover recess 22E, and a center hole 22D provided at the center of the cover recess 22E. The cover recess 22E is provided around the rotation axis R. The top cover 22 is formed by, for example, pressing an aluminum plate or an iron-steel plate into a predetermined shape. A surface processing like plating may be applied on the top cover 22 in order to suppress corrosion. The top cover 22 is fixed to the top face of the outer circumference wall 24B of the chassis 24 by, for example, the six peripheral screws 104. The six peripheral screws 104 correspond to the six screw through-holes 22C and the six screw holes 24C, respectively. In particular, the top cover 22 and the top face of the outer circumference wall 24B are fixed with each other so as to suppress a leak into the interior of the disk drive device 100 from the joined portion of the top cover 22 and the top face of the outer circumference wall 24B. The interior of the disk drive device 100 is, more specifically, a clean space 70 surrounded by the bottom plate 24A of the chassis 24, the outer circumference wall 24B of the chassis 24, and the top cover 22. This clean space 70 is designed so as to be fully sealed, i.e., so as not to have a leak-in from the exterior and a leak-out to the exterior. The clean space 70 is filled with clean gas having particles eliminated. Hence, foreign materials like the particles are prevented from sticking to the magnetic recording disk 62 from the exterior of the clean space 70, thereby improving the reliability of the operation of the disk drive device 100. The center screw 74 corresponds to a retainer hole 10A of the shaft 110. The top cover 22 is joined with the shaft 110 by causing the center screw 74 to pass all the way through the center hole 22D and to engaged with the retainer hole 10A in a screw manner.

Figure 2:
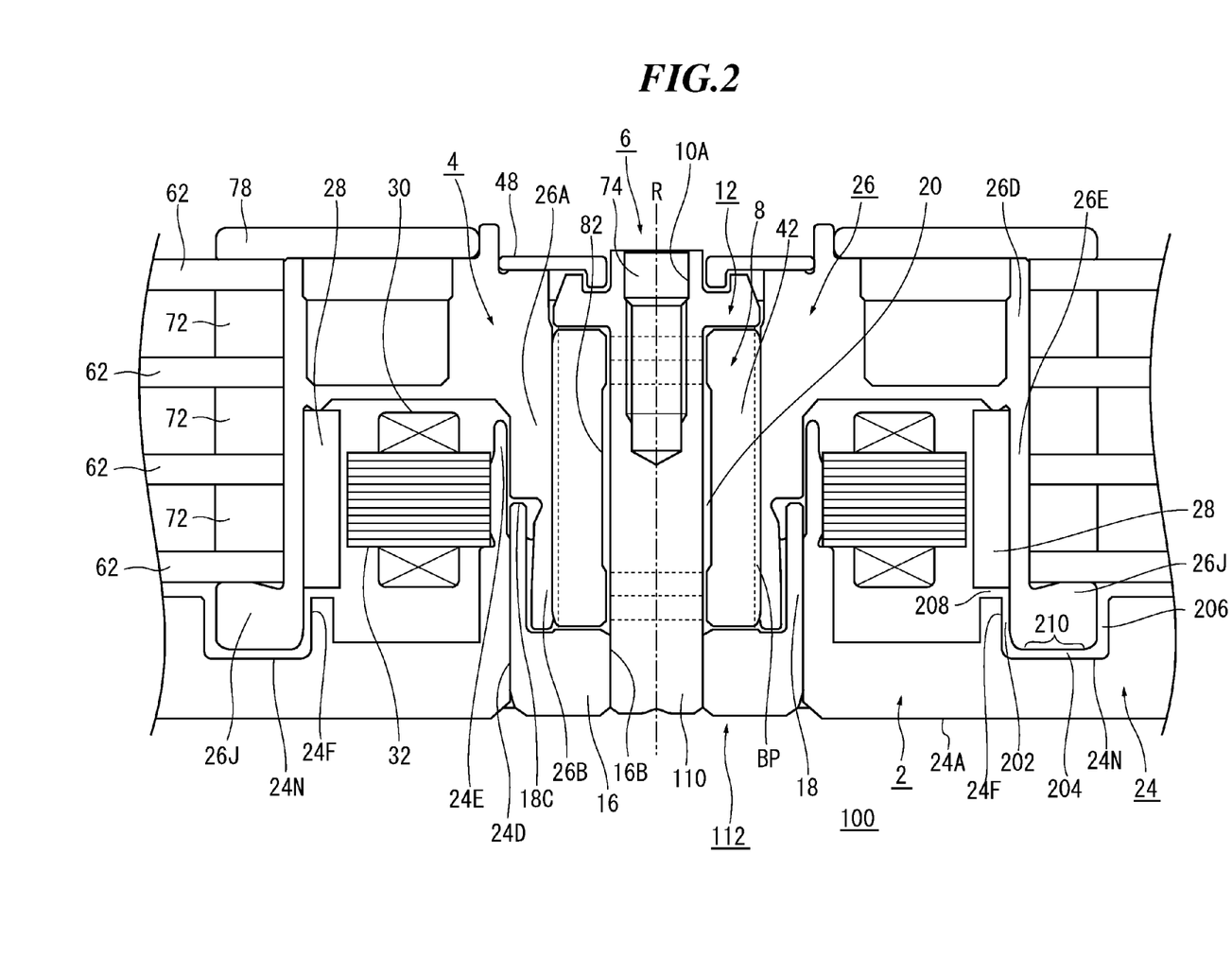
FIG. 2 is a cross-sectional view taken along a line A-A in FIG. 1.

FIG. 2 is a cross-sectional view taken along a line A-A in FIG. 1.

With reference to FIG. 2, a stationary body 2 further includes a shaft body 6, a stator core 32, and coils 30. The shaft body 6 includes the shaft 110 and a shaft holder 112. The shaft 110 has a shaft flange 12 provided at one-end side, i.e., at a side opposite to the shaft holder 112. The shaft holder 112 includes a flange part 16 and a flange encircling part 18.

A rotating body 4 includes the hub 26, a bearing body 8, a cap 48, and a magnet 28 in a cylindrical shape as viewed from the top. The rotating body 4 and the stationary body 2 include, as a lubrication medium, a lubricant 20 continuously present in some gaps between the shaft body 6 and the bearing body 8. The bearing body 8 includes a sleeve 42. The sleeve 42 encircles the shaft 110, and may be referred to as a shaft encircling member in some cases.

The shaft body 6, the bearing body 8, and the lubricant 20 form a fluid bearing unit together with dynamic pressure generating grooves to be discussed later.

The material of and the technique of forming the chassis 24 are not limited to any particular ones. In this embodiment, as an example, the chassis 24 is shaped by die-casting of an aluminum alloy as a single piece. The chassis 24 may be formed by, for example, pressing of a sheet metal, such as stainless steel or aluminum. In this case, the chassis 24 has a part including an embossed face formed by pressing. The chassis 24 may have a surface process layer like nickel plating. In addition, the chassis 24 may have a part formed of a resin. Still further, the chassis 24 may have a coating layer like an epoxy resin. The bottom plate 24A of the chassis 24 may be formed by laminating equal to or greater than two sheets.

The chassis 24 has an opening 24D opened around the rotation axis R of the rotating body 4, and a protrusion 24E which encircles the opening 24D and which is in a cylindrical shape as viewed from the top. The protrusion 24E protrudes toward the hub 26 from the upper face of the bottom plate 24A, and extends beyond the flange encircling part 18 of the shaft holder 112.

Still further, a recess 24N in an annular shape as viewed from the top is provided on the bottom plate 24A of the chassis 24 circularly around the rotation axis R. This recess 24N is provided at a location facing with a mount part 26J of the hub 26 to be discussed later in the axial direction. The mount part 26J of the hub 26 to be discussed later partially enters this recess 24N. The entering part of the hub 26 is provided circularly around the rotation axis R. In addition, in this embodiment, an opposing wall 24F in a circular shape as viewed from the top is provided on the bottom plate 24A circularly around the rotation axis R. This opposing wall 24F is provided at a location included in a projection area of the magnet 28 in the axial direction in this embodiment. Moreover, the opposing wall 24F is provided at a location facing with a part of the inner periphery of the hub 26 in the radial direction, and is continuous from the recess 24N in a cross-sectional view in this embodiment.

A first gap 202 between the opposing wall 24F and the inner periphery of the hub 26 can be from 0.05 to 0.4 mm for example. The lower end face of the mount part 26J of the hub 26 faces with the upper face of the recess 24N of the chassis 24 to form a second gap 204. The second gap 204 runs in the radial direction, and can be from 0.02 to 0.4 mm for example. The outer periphery of the mount part 26J of the hub 26 faces with the inner periphery of the recess 24N of the chassis 24 to form a third gap 206. The third gap 206 runs in the axial direction, and can be from 0.05 to 0.4 mm for example. The lower end face of the magnet 28 faces with an extended face extended in the radial direction from the upper end of the opposing wall 24F of the chassis 24 to form a fourth gap 208. The fourth gap 208 runs in the radial direction, and can be from 0.02 to 0.5 mm for example. In this embodiment, as an example, the first gap 202 is from 0.1 to 0.3 mm, the second gap 204 is from 0.05 to 0.2 mm, the third gap 206 is from 0.1 to 0.3 mm, and the fourth gap 208 is from 0.1 to 0.3 mm.

The first gap 202 has a dimension in the axial direction which is larger than the dimension in the radial direction, and is, for example, equal to or greater than five times as much as the dimension in the radial direction. The second gap 204 has a dimension in the radial direction which is larger than the dimension in the axial direction, and is, for example, equal to or greater than five times as much as the dimension in the axial direction. The third gap 206 has a dimension in the axial direction which is larger than the dimension in the radial direction, and is, for example, equal to or greater than five times as much as the dimension in the radial direction. The fourth gap 208 has a dimension in the radial direction which is larger than the dimension in the axial direction, and is, for example, equal to or greater than twice and equal to or less than five times as much as the dimension in the axial direction.

The hub 26 includes a hub opposing face that faces the chassis 24 in a region outwardly in the radial direction with respect to the inner periphery of the magnet 28. The chassis 24 has a chassis opposing face that faces the hub opposing face with an opposing gap. A gas dynamic pressure generating groove that generates dynamic pressure in a pump-in direction to a gaseous body present in the opposing gap when the hub 26 rotates relative to the chassis 24 may be provided in either one of the chassis opposing face and the hub opposing face. The gas dynamic pressure generating groove is provided in an area outwardly in the radial direction with respect to the inner periphery of the magnet 28, and the gaseous body present in such an area can be efficiently pushed in the interior.

As an example, a radial gas dynamic pressure generating groove that pushes the gaseous body present in the first gap 202 toward the magnet 28 when the hub 26 rotates may be provided in either one of the opposing faces in the radial direction forming the first gap 202. As another example, a thrust gas dynamic pressure generating groove that pushes the gaseous body present in the second gap 204 toward the first gap 202 when the hub 26 rotates may be provided in either one of the opposing faces in the axial direction forming the second gap 204. As the other example, another radial gas dynamic pressure generating groove that pushes the gaseous body present in the third gap 206 toward the second gap 204 when the hub 26 rotates may be provided in either one of the opposing faces in the radial direction forming the third gap 206. Such a gas dynamic pressure generating groove may be provided in solo or in a multiple manner. The gas dynamic pressure generating groove is formed in, for example, a spiral shape or in a herringbone shape.

In this embodiment, a gas dynamic pressure generating groove 210 that is in a spiral shape and formed in an area which is the lower end face of the mount part 26J of the hub 26 and which faces the upper face of the recess 24N of the chassis 24 in the axial direction. In this case, it becomes possible for the disk drive device 1 to prevent the gasified lubricant 20 from diffusing around the magnetic recording disks 62.

The gas dynamic pressure generating groove 210 can be provided through, for example, a technique of directly forming such a groove in the lower end of the mount part 26J or through a technique of fastening an additional member formed with the gas dynamic pressure generating groove 210 in advance to the lower end of the mount part 26J. This additional member can be formed through, for example, a technique of pressing a metal material or the like, or a technique of molding and shaping a resin material. The gas dynamic pressure generating groove 210 can be also formed through techniques, such as pressing, ball-rolling, electrochemical machining, or cutting. The same is true of the respective opposing faces forming the second gap 204 and the third gap 206 which may be provided with a gas dynamic pressure generating groove.

The stator core 32 includes an annular part, and, for example, 12 salient poles protruding outwardly in the radial direction from the annular part. The stator core 32 has the inner periphery of the annular part joined with the protrusion 24E by press-fitting, bonding or a combination thereof. The stator core 32 is formed by laminating and caulking, for example, five to 20 magnetic steel sheets together each having a thickness of 0.2 to 0.35 mm. In this embodiment, as an example, 12 magnetic steel sheets each having a thickness of 0.2 mm are laminated together. A surface layer is provided on the surface of the stator core 32. An insulation painting, such as electro-deposition coating or powder coating, is applied to the surface of the stator core 32, i.e., the surface layer.

The coils 30 are each formed by winding a conductor wire around each salient pole of the stator core 32 by a predetermined number of turns. The coil 30 generates a field magnetic field along the salient pole when a drive current is caused to flow through the coil 30. The conductor wire is formed by, for example, covering the surface of a wire core like soft copper with an insulation layer like a urethane resin. A lubrication material is applied to the surface of the conductor wire to reduce a frictional resistance. The lubrication material is not limited to any particular one, but in this embodiment, a lubrication material containing a polyamide compound as a primary constituent is applied to the wire to reduce an adhesion of hydrocarbon like paraffin as little as possible. In addition, the coil 30 wound around the salient pole is dipped in pure water or a cleaning liquid containing surfactant agent or an ester and is cleaned while being irradiated with ultrasound to further reduce hydrocarbon sticking to the surface of the conductor wire. As a result, the total amount of hydrocarbons sticking to the coil 30 becomes smaller than the total amount of polyamide compounds sticking to the coil 30.

The hub 26 includes a sleeve encircling part 26A fastened to the sleeve 42 in a manner encircling the sleeve 42, and facing with the flange encircling part 18, an extended part 26B that extends from the sleeve encircling part 26A toward the flange 16 and enters the interior of the flange encircling part 18, a disk part 26D that extends outwardly in the radial direction from the center of the hub 26, an annular part 26E that projects from the outer periphery of the disk part 26D downwardly in the axial direction, and the mount part 26J that extends outwardly in the radial direction from the lower outer periphery of the annular part 26E.

The sleeve encircling part 26A faces with the protrusion 24E with a gap in the radial direction, and faces with the flange encircling part 18 with a gap in the axial direction. In addition, the extended part 26B faces with the flange encircling part 18 with a gap in the radial direction, and faces with the flange 16 with a gap in the axial direction.

The disk part 26D, the annular part 26E, and the mount part 26J are formed in an annular shape coaxially with each other along the rotation axis R. As a result, the hub 26 is in a substantially cup shape. The disk part 26D, the annular part 26E, and the mount part 26J are formed together as a single piece. The hub 26 is formed of a ferrous material with a soft magnetism like SUS 430 F. The annular part 26E of the hub 26 is to be engaged with the center hole of the magnetic recording disk 62 in a disk shape, and such a magnetic recording disk 62 is to be mounted on the mount part 26J. The mount part 26J has at least a part that enters the recess 24N provided in the bottom plate 24A of the chassis 24. Gaps between the recess 24N, the mount part 26J, and the opposing wall 24F form a labyrinth.

In order to let the four magnetic recording disks 62 spaced apart from each other, the spacers 72 are provided. The spacers 72 are each in a hollow ring shape, and each have an inner periphery engaged with the annular part 26E. Each spacer 72 is held between the lower magnetic recording disk 62 and the upper magnetic recording disk 62. In addition, in order to prevent the uppermost magnetic recording disk 62 from being detached from the hub 26, the clamper 78 is provided. The clamper 78 is in a hollow disk shape, and is fastened to the upper face of the hub 26 by, for example, an unillustrated fastener like a screw. Accordingly, the clamper 78 holds the uppermost magnetic recording disk 62 to prevent it from being detached from the hub 26.

The magnet 28 is in a hollow ring shape, and has an outer periphery fastened to the inner periphery of the hub 26 by, for example, bonding. The upper face of the magnet 28 abuts a protrusion projecting from the internal face of the hub 26. The magnet 28 is formed of, for example, a ferrite-based magnetic material or a rare-earth-based magnetic material. As a binder, a resin like polyamide is contained in the magnet 28. The magnet 28 may be formed by laminating a ferrite-based magnetic layer and a rare-earth-based magnetic layer. The magnet 28 has a surface layer formed by, for example, electro-deposition coating or a spray painting. The surface layer suppresses an oxidization of the magnet 28, or suppresses a peeling of the surface of the magnet 28. The magnet 28 has, for example, 16 polarities in the inner periphery in the circumferential direction, and has the inner periphery facing with the outer periphery of each salient pole of the core 32 with a gap in the radial direction. The height dimension of the magnet 28, i.e., the thickness thereof is 100 to 200% of the thickness of the stator core 32. In this embodiment, the thickness of the magnet 28 is substantially 180% of the thickness of the stator core 32.

Figure 3:
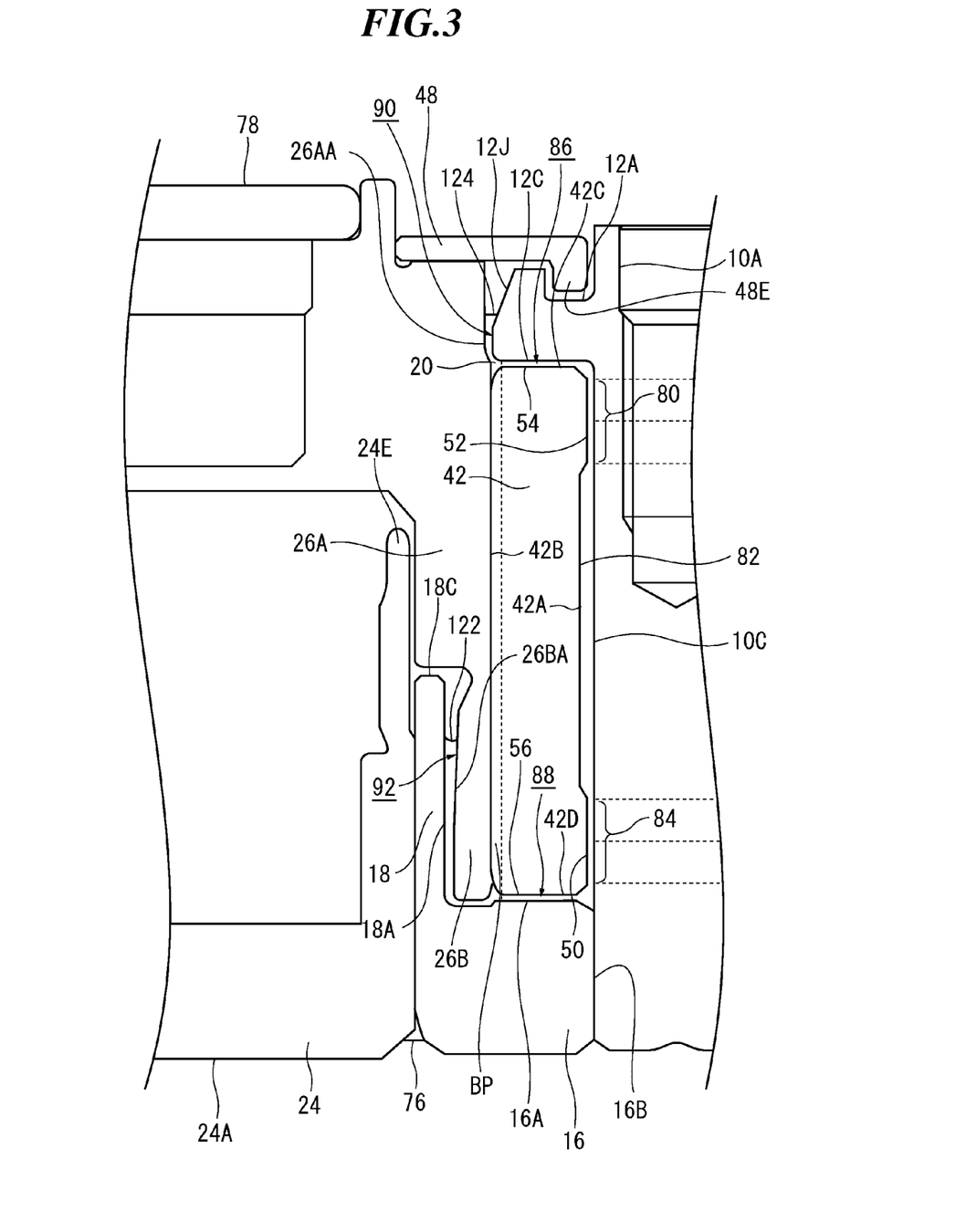
FIG. 3 is an enlarged cross-sectional view illustrating peripheral portions of a shaft body and a bearing body in FIG. 2 in an enlarged manner.

Next, with reference to FIG. 3, an explanation will be given of a fluid bearing unit and the periphery thereof. FIG. 3 is an enlarged cross-sectional view illustrating the periphery of the shaft body 6 and that of the bearing body 8 in FIG. 2 in an enlarged manner. FIG. 3 mainly illustrates the left part to the rotation axis R. The fluid bearing unit includes gas-liquid interface between the lubricant 20 and an ambient gaseous body in the gap between the shaft body 6 and the bearing body 8. In this embodiment, a first gas-liquid interface 124 to be discussed later and which is a base-side gas-liquid interface is exposed in an area held between the chassis 24 and the hub 26. Moreover, this fluid bearing unit has a second gas-liquid interface 122 to be discussed later and which is a hub-side gas-liquid interface exposed in an area opened at a distant side of the hub 26 from the chassis 24 in the axial direction.

First, a structure of the shaft body 6 will be explained in detail. The shaft holder 112 of the shaft body 6 includes, as explained above, the flange 16 and the flange encircling part 18. The flange 16 has a shaft insertion hole 16B formed at the center in a coaxial manner with the rotation axis R. The flange encircling part 18 protrudes from the outer periphery of the flange 16 toward the hub 26. The shaft holder 112 has, for example, the flange 16 and the flange encircling part 18 formed together as a single piece. In this case, the manufacturing error of the shaft holder 112 can be reduced, and a joining work can be eliminated. Alternatively, a deformation of the shaft holder 112 due to an impact load can be suppressed. The shaft holder 112 is formed by, for example, cutting and machining a metal material like SUS 303. Depending on the application of the disk drive device 100 and the limitation in the designing thereof, the shaft holder 112 may be formed of other materials like a resin, and may be formed through other techniques, such as pressing and molding.

The shaft holder 112 has the flange encircling part 18 engaged with the opening 24D of the chassis 24, and has the outer periphery of the flange encircling part 18 bonded with the inner periphery of the opening 24D by, for example, a bond 76, thereby being fastened to the chassis 24. The flange encircling part 18 has an upper end 18C located at an area where a second radial dynamic pressure generating groove 50 to be discussed later is provided in the axial direction or located thereabove, and faces with the sleeve encircling part 26A of the hub 26 with a gap.

The shaft 110 has the shaft flange 12 provided at the one-end side as explained above. The shaft flange 12 is disposed so as to cover the upper face of the sleeve 42 in the axial direction with a gap, and to face the sleeve encircling part 26A of the hub 26 in the radial direction with a gap. The shaft flange 12 has, in its outer periphery, a tapered face 12J having a distance from the rotation axis R in the radial direction becoming large as becoming close to the chassis 24. In addition, the shaft flange 12 is formed with a groove 12A in the inner periphery and in an annular shape as viewed from the top. A part of the cap 48 to be discussed later enters this groove 12A with a gap.

The shaft 110 has a retainer hole 10A that is formed in one end, i.e., the end at a side where the shaft flange 12 is formed and retains the fastener like the screw 74. The shaft 110 has another end inserted in a shaft insertion hole 16B of the flange 16, and is fastened thereto by, for example, interference fitting. This interference fitting can be realized by, for example, pressing the shaft 110 in the shaft insertion hole 16B, thermal insertion, inserting the shaft 110 cooled by a liquid nitrogen beforehand into the shaft insertion hole 16B and letting such a cold shaft 110 to be a normal temperature. Bonding may be applied in such an interference fitting.

The shaft 110 and the shaft flange 12 are formed integrally. In this case, the manufacturing error between the shaft 110 and the shaft flange 12 can be reduced, and a joining work can be eliminated. Depending on the application and a limitation in the designing, the shaft flange 12 and the shaft 110 may be formed separately.

The shaft 110 is formed by, for example, cutting and machining or grinding and machining a ferrous material, such as SUS 420 J2, SUS 430, or SUS 303. The shaft 110 may be quenched in order to enhance the hardness. The shaft 110 may have an outer periphery 10C and a lower face 12C of the shaft flange 12 polished in order to enhance the dimensional precision. The shaft 110 may be formed of other materials like a resin and may be formed through other techniques, such as pressing and molding.

Next, a structure of the bearing body 8 will be explained in detail. The bearing body 8 includes the sleeve 42 in a substantially cylindrical shape and encircling a middle part of the shaft 110, i.e., a part between the shaft flange 12 and the flange 16. The sleeve 42 is joined with the sleeve encircling part 26A of the hub 26. The sleeve 42 has an upper end facing with the lower face 12C of the shaft flange 12 with a gap in the axial direction, and has a lower end facing with an upper face 16A of the flange 16 with a gap in the axial direction. According to such a structure, the sleeve 42 is freely rotatable with respect to the shaft 110, and thus the hub 26 joined with the sleeve 42 is freely rotatable with respect to the chassis 24.

The bearing body 8 is formed by, for example, cutting and machining a metal material, such as SUS 430 or stainless steel. The bearing body 8 may have a surface layer formed by, for example, electroless nickel plating. The bearing body 8 may be formed of other materials like brass.

The sleeve 42 is in a substantially cylindrical shape with a hollow, and includes an inner periphery 42A, an outer periphery 42B, an upper face 42C, and a lower face 42D. The sleeve 42 has the inner periphery 42A encircling the shaft 110 with a gap.

Provided in a gap in the radial direction between the inner periphery 42A of the sleeve 42 and the outer periphery 10C of the shaft 110 are, from top to bottom in this order, a first radial dynamic pressure bearing 80, an intermediate space 82, and a second radial dynamic pressure bearing 84 in this order. The first radial dynamic pressure bearing 80 is provided above the second radial dynamic pressure bearing 84 so as to be distant therefrom, and the intermediate space 82 is provided between the first radial dynamic pressure bearing 80 and the second radial dynamic pressure bearing 84. A first radial dynamic pressure generating groove 52 to generate radial dynamic pressure is provided in an area corresponding to the first radial dynamic pressure bearing 80 in the inner periphery 42A of the sleeve 42. The first radial dynamic pressure generating groove 52 may be provided in the outer periphery 10C of the shaft 110 instead of the sleeve 42. A second radial dynamic pressure generating groove 50 to generate radial dynamic pressure is provided in an area corresponding to the second radial dynamic pressure bearing 84 in the inner periphery 42A of the sleeve 42. The second radial dynamic pressure generating groove 50 may be provided in the outer periphery 10C of the shaft 110 instead of the sleeve 42. A large-diameter part recessed outwardly in the radial direction is provided in an area corresponding to the intermediate space 82 of the inner periphery 42A of the sleeve 42.

Still further, the sleeve 42 has a communication channel BP which is provided in the outer periphery 42B and which runs in the axial direction so as to be in communication with a first thrust opposing part 86 and a second thrust opposing part 88 to be discussed later. The communication channel BP is formed in the outer periphery 42B of the sleeve 42 so as to include grooves running from the upper end to the lower end in the axial direction.

The first thrust opposing part 86 is provided in a gap between the shaft flange 12 and the sleeve 42 where the lower face 12C and the upper face 42C face with each other in the axial direction. A first thrust dynamic pressure generating groove 54 to generate thrust dynamic pressure is provided in an area of the upper face 42C of the sleeve 42 corresponding to the first thrust opposing part 86. The first thrust dynamic pressure generating groove 54 may be provided in an area of the lower face 12C of the shaft flange 12 corresponding to the first thrust opposing part 86 instead of the sleeve 42. Conversely, a second thrust opposing part 88 is provided in a gap between the flange 16 and the sleeve 42 where the upper face 16A and the lower face 42D face with each other in the axial direction. A second thrust dynamic pressure generating groove 56 to generate thrust dynamic pressure is provided in an area of the lower face 42D of the sleeve 42 corresponding to the second thrust opposing part 88. The second thrust dynamic pressure generating groove 56 may be provided in an area of the upper face 16A of the flange 16 corresponding to the second thrust opposing part 88 instead of the sleeve 42.

The first thrust dynamic pressure generating groove 54 and the second thrust dynamic pressure generating groove 56 are each formed in, for example, a spiral shape. The first thrust dynamic pressure generating groove 54 and the second thrust dynamic pressure generating groove 56 may be formed in other shapes like a herringbone shape. The second radial dynamic pressure generating groove 50, the first radial dynamic pressure generating groove 52, the first thrust dynamic pressure generating groove 54, and the second thrust dynamic pressure generating groove 56 are formed by, for example, pressing, ball-rolling, electro-chemical machining, and cutting. Those dynamic pressure generating grooves may be formed through different techniques, respectively.

The outer periphery of the extended part 26B has an inclined face 26BA provided in an area where it faces an inner periphery 18A of the flange encircling part 18 in the radial direction and having an outer diameter becoming small as becoming close to the upper end of the extended part 26B. A gap between the inclined face 26BA and the inner periphery 18A in the radial direction includes a tapered space gradually becoming wider toward the upper space in the axial direction. The inclined face 26BA and the inner periphery 18A contact a second gas-liquid interface 122 of the lubricant 20 to be discussed later, and form a second capillary seal 92 that suppresses a spill of the lubricant 20 by capillary force. For example, the second gas-liquid interface 122 is located at the disposed area of the second radial dynamic pressure generating groove 50 or thereabove in the axial direction. For example, the second gas-liquid interface 122 is provided outwardly in the radial direction with respect to the first thrust opposing part 86 and the second thrust opposing part 88.

The sleeve encircling part 26A faces the shaft flange 12 with a gap in the radial direction at the upper side of the sleeve 42. A gap in the radial direction between an inner periphery 26AA of the sleeve encircling part 26A and the tapered face 12J of the shaft flange 12 forms a tapered space gradually becoming wide toward the upper space. The inner periphery 26AA and the tapered face 12J contact a first gas-liquid interface 124 of the lubricant 20, and form a first capillary seal 90 that suppresses a spill of the lubricant 20 by capillary force.

The cap 48 is a hollow ring thin in the axial direction, and is formed by, for example, cutting and machining a stainless steel material, such as SUS 303 or SUS 430. The cap 48 may be formed of other metal or resin materials and may be formed by pressing or molding. The cap 48 is fastened to the bearing body 8 so as to have an inner periphery encircling the shaft body 6 with a gap. More specifically, the inner periphery of the cap 48 faces the outer periphery of the upper end of the shaft 110 in a non-contact manner, and the outer periphery of the cap 48 is bonded and fastened to the upper end face of the sleeve encircling part 26A. The cap 48 covers the first gas-liquid interface 124 and a part of the shaft flange 12. The inner periphery of the cap 48 is provided with a circular projection 48E that extends downwardly around the rotation axis R. A part of the circular projection 48E enters the circular groove 12A in the axial direction provided around the rotation axis R in the upper face of the shaft flange 12. Note that the cap 48 may be fastened to the shaft body 6 and may be provided in a non-contact manner with the hub 26.

Next, an explanation will be given of the lubricant. Various materials, such as a synthetic oil or a mineral oil, are applicable as the lubricant. As the lubricant 20 in this embodiment, as an example, a synthetic oil containing an ester-based compound as a primary element is utilized as a base oil. The lubricant 20 of this embodiment is fluorescent. The term fluorescence in the explanation for this embodiment means fluorescence in the broad sense including phosphorescence in addition to fluorescence in the narrow sense. For example, the base oil itself may contain a fluorescent material with a fluorescence characteristic. According to the lubricant 20 of this embodiment, a fluorescence substance is added to the base oil. The fluorescence substance is not limited to any particular one, but various fluorescence substances, such as inorganic substances including a rare-earth salt, a uranyl salt, a platinum cyan complex salt, and a tungsten acid salt, and organic substances including benzene, aniline, anthracene, a phthalein-based pigment, a porphyrin-based pigment, and a cyan-based pigment, are applicable. According to the lubricant 20 of this embodiment, as an example, fluorescein as a fluorescence substance is added. Fluorescein emits visible light that is green spectrum when irradiated with ultraviolet rays with a shorter wavelength than that of visible light. This may be caused by a photoluminescence phenomenon.

When a fluorescence substance is added to the lubricant, such a fluorescence substance may chemically react with the base oil of the lubricant, which deteriorates the base oil. Hence, it is desirable that the fluorescence substance should deteriorate the base oil as little as possible even if added to the base oil. In addition, when the lubricant is used at a temperature equal to or higher than the boiling point of the fluorescence substance, the fluorescence substance is easily vaporized, and may stick to the surface of the magnetic recording disk, which causes a breakdown. Hence, the boiling point of the fluorescence substance contained in the lubricant 20 of this embodiment is set to be higher than the boiling point of water. In this case, when the lubricant is used within a temperature range that is equal to or lower than the boiling point of water, the vaporization of the fluorescence substance can be suppressed. In other words, when the use temperature is near the boiling point of water, if the use temperature is equal to or lower than the boiling point of water, the disk drive device 100 can be used.

The containing rate of the fluorescence substance in the lubricant can be set to, for example, equal to or greater than 0.001 mass %. In this case, the lubricant emits fluorescence when irradiated with light having a predetermined characteristic. In this embodiment, as an example, the containing rate of the fluorescence substance in the lubricant 20 is set to equal to or greater than 0.01 mass %. In this case, when the lubricant 20 is irradiated with predetermined light, the lubricant 20 emits further intensive fluorescence in comparison with a case in which the containing rate is 0.001 mass %. When, however, the containing rate of the fluorescence substance in the lubricant increases, the costs of the lubricant may increase. In this embodiment, as an example, the containing rate of the fluorescence substance in the lubricant 20 is set to equal to or smaller than 1 mass %. In this case, it is confirmed that the increase in the costs of the lubricant 20 is within a practical range.

Next, an explanation will be given of a region where the lubricant 20 is present. The lubricant 20 is continuously present in the gap between the bearing body 8 and the shaft body 6 from the first gas-liquid interface 124 to the second gas-liquid interface 122. More specifically, the lubricant 20 is present in a region including a gap between the tapered face 12J and the inner periphery 26AA, a gap between the shaft flange 12 and the sleeve 42, a gap in the radial direction between the sleeve 42 and the shaft 110, a gap between the sleeve 42 and the flange 16, a gap between the extended part 26B and the flange 16, and a gap between the inclined face 26BA and the inner periphery 18A. In other words, the lubricant 20 is continuously applied from the first gas-liquid interface 124 to the second gas-liquid interface 122 in a region including the first thrust opposing part 86, the first radial dynamic pressure bearing 80, an intermediate space 82, the second radial dynamic pressure bearing 84, and the second thrust opposing part 88. In addition, the lubricant 20 is also continuously applied in a region including the communication passage BP from the first gas-liquid interface 124 to the second gas-liquid interface 122.

With respect to the lubricant 20, an explanation will be below given of a labyrinth structure. As explained above, the sleeve encircling part 26A faces with the protrusion 24E with a gap in the radial direction, and faces with the upper end 18C of the flange encircling part 18 with a gap in the axial direction. Hence, the respective gaps between the sleeve encircling part 26A, the protrusion 24E, and the upper end 18C form a first labyrinth. In addition, the lower end of the mount part 26J of the hub 26 enters the recess 24N of the chassis 24, and forms a second labyrinth that includes the fourth gap 208, the first gap 202, the second gap 204, and the third gap 206. Still further, the gap between the cap 48 and the shaft flange 12 forms a third labyrinth.

Next, an explanation will be given of an operation of the fluid bearing unit. When the bearing body 8 rotates relative to the shaft body 6, the second radial dynamic pressure generating groove 50, the first radial dynamic pressure generating groove 52, the first thrust dynamic pressure generating groove 54, and the second thrust dynamic pressure generating groove 56 respectively generate dynamic pressures to the lubricant 20. Such dynamic pressures support the rotating body 4 coupled with the bearing body 8 in a non-contact manner with respect to the stationary body 2 coupled with the shaft body 6.

Next, an explanation will be given of an example method for manufacturing the disk drive device 100 of this embodiment.

First, the sleeve 42 is fastened to the hub 26 by, for example, bonding. Next, the sleeve 42 is held between the shaft holder 112 and the shaft 110, and the shaft holder 112 and the shaft 110 are joined with each other by a technique that is a combination of press-fitting and bonding. In the following explanation, the assembled piece including the hub 26, the sleeve 42, the shaft holder 112, and the shaft 110 is referred to as a subassembly. Subsequently, the lubricant 20 is injected in a region of the sub assembly where the lubricant should be applied. For example, the sub assembly is left in a pressure-reduced atmosphere to draw out air in the region where the lubricant should be applied. Next, the lubricant 20 is applied to, for example, the gap between the hub 26 and the shaft flange 12. Subsequently, the atmosphere is returned to an atmospheric pressure, and the lubricant 20 is injected in the region of the sub assembly where the lubricant should be applied, thereby finishing the bearing unit.

Figure 4:
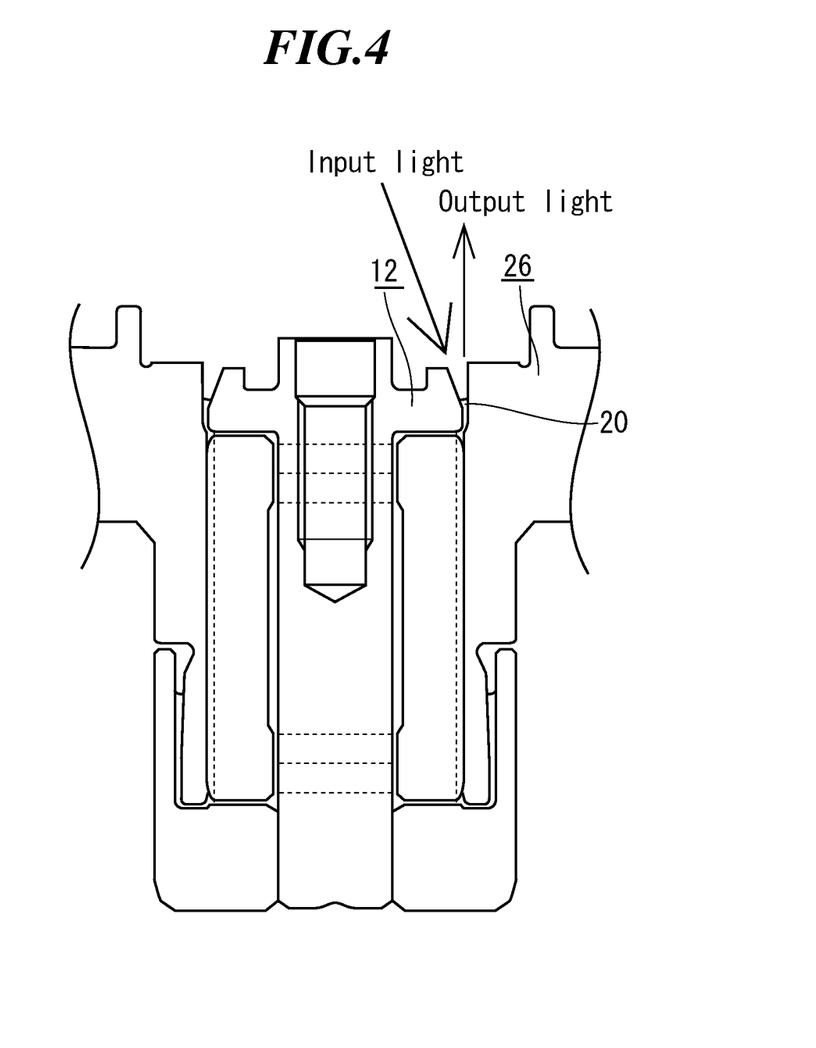
FIG. 4 is a cross-sectional view illustrating a process of emitting input light to the lubricant and of obtaining output light.

Next, with respect to the bearing unit to which the lubricant 20 is applied, the first gas-liquid interface 124 of the lubricant 20 is observed to confirm that the first gas-liquid interface 124 is located within a predetermined range. At this time, if the lubricant is substantially transparent, it takes a time for checking. In this embodiment, since the lubricant 20 is fluorescent, when, for example, input light with a predetermined wavelength like ultraviolet rays is emitted, output light with a different wavelength like blue or green is output. FIG. 4 is a cross-sectional view illustrating a step for emitting input light to the lubricant 20 and for obtaining output light. In this step, input light that is ultraviolet rays with a predetermined wavelength is emitted to the first gas-liquid interface 124 in the gap between the hub 26 of the bearing unit and the shaft flange 12 thereof, and output light like blue or green fluorescence is obtained. In this case, it becomes easy to check the first gas-liquid interface 124, and necessary time for checking can be reduced, and thus the productivity is improved. In this case, moreover, output light with a predetermined wavelength is obtainable, and thus the location of the first gas-liquid interface 124 can be inspected by calculating the light intensity of the output light with the predetermined wavelength. For example, when a correlation between the location of the first gas-liquid interface 124 and the light intensity of the output light is obtained in advance, the location of the first gas-liquid interface 124 can be obtained based on the light intensity of the measured output light and the correlation. In this case, the checking of the first gas-liquid interface 124 can be further facilitated. The input light may be widely emitted to a region including the first gas-liquid interface 124.

When the amount of foreign light other than the input light is large, the detection precision of the output light may decrease. Accordingly, the step for detecting the output light should be performed in an environment like a dark room that is not likely to be affected by foreign light. Since it is not likely to be affected by foreign light, a reduction of the detection precision of the output light can be suppressed, and thus the checking precision of the first gas-liquid interface 124 can be improved.

When the output light is inspected visually, a checking may be overlooked in the case of a prolonged work. Hence, the output light can be detected through a photoelectric element like a CCD. In addition, output signals by the photoelectric element are converted into digital lights, input to a microprocessor, and the microprocessor is operated in accordance with a predetermined program to obtain an inspection result. This reduces the possibility that the checking is overlooked even in the case of a prolonged work.

In addition, a flexible optical fiber is applicable. For example, the tip of an optical fiber for emitting light is caused to be located near an inspection target region to emit the input light. Moreover, the tip of the optical fiber for detecting light is caused to be located near the inspection target region to detect the output light. In this case, an inspection is enabled for an inspection target region where it is difficult to directly emit the input light from the exterior. For example, it is difficult to directly emit the input light to the second gas-liquid interface 122 due to the shape of the hub 26, but when the tip of an optical fiber for light emission or detection is inserted to the proximity of the second gas-liquid interface 122, an inspection is enabled. The optical fiber for light detection may be formed integrally with the optical fiber for light emission.

Subsequently, the cap 48 and the magnet 28 are respectively fastened to the hub 26 by bonding. Next, the chassis 24 having the stator core 32 with coils 30 fastened is prepared, and the bearing unit is fastened to the chassis 24 by bonding. Subsequently, the magnetic recording disks 62, the clamper 78, and the spacers 72 are attached. Next, the data reader/writer 60 and the top cover 22 are attached. Subsequently, the disk drive device 100 is finished through predetermined steps like an inspection. Moreover, a step for detecting the lubricant 20 sticking to an unintended part of the disk drive device 100 or leaking therefrom may be performed. For example, when the hub 26, the chassis 24, or the bearing unit is irradiated with the input light like ultraviolet rays, the sticking or leaking lubricant 20 emits, for example, green or blue output light, and thus such a lubricant 20 can be easily detected. The above-explained steps are merely examples, and the disk drive device 100 can be assembled through different steps.

Next, an explanation will be given of an operation of the disk drive device 100 structured as explained above. In order to rotate the magnetic recording disks 62, a drive current of three phases is supplied to the coils 30. When the drive current flows through the respective coils 30, field magnetic fluxes are produced along the salient poles of the stator core 32. A mutual effect of such field magnetic fluxes and the magnetic fluxes of the drive magnetic poles of the magnet 28 applies torque to the magnet 28, and thus the hub 26 and the magnetic recording disk 62s engaged therewith start rotating. While at the same time, the voice coil motor 66 swings the swing arm 64, and thus the recording/playing head comes and goes within the swingable range over the magnetic recording disk 62. The recording/playing head converts magnetic data recorded in the magnetic recording disk 62 into electric signals, and transmits the electric signals to an unillustrated control board, and writes data transmitted from the control board in the form of electric signals on the magnetic recording disk 62 as magnetic data.

The disk drive device 100 of this embodiment employing the above-explained structure can accomplish the following advantages.

According to the disk drive device 100, the lower end face of the mount part 26J of the hub 26 which forms the second gap 204 is provided with the gas dynamic pressure generating groove 210. Hence, the gas present in the second gap 204 is pushed to the interior when the hub 26 rotates, and it becomes possible for the disk drive device 100 to prevent the vaporized lubricant 20 from reaching the clean space 70.

According to the disk drive device 100, the sleeve encircling part 26A, the protrusion 24E, and the upper end 18C of the flange encircling part 18 form the first labyrinth. This first labyrinth suppresses a spilling and vaporization of the lubricant 20 from the second gas-liquid interface. In addition, the lower end of the mount part 26J of the hub 26 enters the recess 24N of the chassis 24, and forms the second labyrinth. This second labyrinth prevents, even if the vaporized lubricant 20 reaches the interior of the hub 26, i.e., the region where the coils 30 and the stator core 32 are disposed beyond the first labyrinth, the vaporized lubricant 20 from further reaching the exterior of the hub 26, i.e., the disposed area of the magnetic recording disks 62 (the clean space 70) through the recess 24N due to a passage resistance.

Still further, the gap between the cap 48 and the groove 12A of the shaft flange 12 forms the third labyrinth. This third labyrinth prevents the lubricant 20 from spilling and vaporizing from the first gas-liquid interface 124. Hence, the disk drive device 100 can prevent the vaporized lubricant 20 from building up condensations on the surface of the magnetic recording disks 62 and being deposited thereon. This enables a further increase in the recording capacity.

Since the first to third labyrinths suppress a vaporization, etc., of the lubricant 20, a time until the disk drive device 100 lacks the lubricant 20 can be elongated. This extends the operation life of the disk drive device 100.

According to the disk drive device 100, the lubricant 20 is fluorescent, and thus it is easy to detect when the lubricant 20 is sticking to an unintended part. In addition, it is also easy to detect when the lubricant 20 is leaking from a gap between components. Since the lubricant 20 emits output light with a different wavelength from the wavelength of input light when irradiated with the input light, the output light can be distinctively detected from the input light. The disk drive device 100 has the gas-liquid interfaces of the lubricant 20, and the gas-liquid interfaces emit output light with a different wavelength from the wavelength of input light when irradiated with the predetermined input light, and thus the output light from the gas-liquid interfaces can be distinctively detected from the input light. Still further, the disk drive device 100 has the lubricant 20 emitting blue or green light when irradiated with ultraviolet rays. Accordingly, the output light can be easily determined when a checking is performed using a photoelectric element like CCD or is performed visually.

According to the disk drive device 100, the lubricant 20 contains the luminous substance, and thus a desired light emission characteristic can be obtained by adjusting the containing rate of the luminous substance, which increases the range of choice for the luminous substance. In addition, when the lubricant contains the luminous substance at a rate of 0.001 mass % to 1 mass %, the lubricant emits light in accordance with the input light. According to the disk drive device 100, since the boiling point of the luminous substance contained in the lubricant 20 is higher than the boiling point of water, the disk drive device 100 can be used at a temperature near the boiling point of water.

The explanation was given of the structure and operation of the disk drive device according to the embodiment, but those are merely examples, and it should be understood by those skilled in the art that various changes in the combination of the respective components are permitted and such a structure is within the scope and spirit of the present invention.

In the above-explained embodiment, the explanation was given of the example case in which the lubricant 20 obtained by adding the fluorescence substance to the base oil that contains the ester-based compound as the primary element was used, but the present invention is not limited to this case. For example, a lubricant containing an ionic solution may be utilized. When the lubricant contains the ionic solution, a vaporization of the lubricant can be suppressed, and thus the amount of lubricant diffused in the disk drive device can be reduced. This reduces the amount of the lubricant deposited on the magnetic recording disk. The ionic solution is not limited to any particular one, but an ionic solution disclosed in JP 2007-120653 A is applicable. The disclosure of this patent application is incorporated in this specification by reference. The lubricant containing the ionic solution can also contain the above-explained fluorescence substance.

In the above-explained embodiment, the explanation was given of the example case in which the rotating body 4 is coupled with the bearing body 8, and the shaft body 6 is coupled with the stationary body 2, but the present invention is not limited to this case. A structure may be employed in which the rotating body 4 is coupled with the shaft body 6, and the bearing body 8 is coupled with the stationary body 2.

In the above-explained embodiment, although the explanation was given of the example case in which the stator core is encircled by the magnet, the present invention is not limited to this case. For example, a structure may be employed in which the magnet is encircled by the stator core.

In the above-explained embodiment, the explanation was given of the example case in which the first thrust dynamic pressure generating groove 54 is provided in an area of the upper face 42C of the sleeve 42 corresponding to the first thrust opposing part 86, but the present invention is not limited to this case. For example, a structure may be employed in which no thrust dynamic pressure generating groove is provided at all in the upper face 42C and the lower face 12C of the shaft flange 12 in the first thrust opposing part 86.

What is claimed is:

1. A disk drive device comprising:
a rotating body including a hub on which a recording disk is mountable, and a sleeve;
a stationary body including a chassis and a shaft assembly, the shaft assembly including a shaft that is inserted in the sleeve, a first flange that is provided at a first-end-side portion of the shaft, a second flange that is provided at a second-end-side portion of the shaft, and a flange encircling part that protrudes from the second flange toward the hub so as to encircle a part of the sleeve, wherein the chassis supports the shaft assembly;
a first capillary seal which is formed in a gap between an outer circumference of the first flange and the hub, and which is opened toward an external space in an axial direction of the disk drive device, wherein a first gas-liquid interface is present in the first capillary seal;
a second capillary seal which is formed between the sleeve and the flange encircling part, and which is opened toward the first capillary seal in the axial direction;
a fluorescent lubricant which is applied between the stationary body and the rotating body from the first capillary seal to the second capillary seal, and which is a synthetic oil that contains an ester-based compound as a primary element, wherein the synthetic oil contains a luminous substance at a rate of at least 0.001 mass % to at most 1 mass %;
a cap which at least partially covers an opening of the first capillary seal, is provided in a non-contact manner with the fluorescent lubricant, and forms a labyrinth in a gap with the stationary body; and
a protrusion which protrudes from the chassis toward the hub along the flange encircling part, at least partially covers an opening of the second capillary seal, is provided in a non-contact manner with the fluorescent lubricant, and forms a labyrinth in a gap with the rotating body.

2. The disk drive device according to claim 1, wherein the gap between the outer circumference of the first flange and the hub includes a contact area with which the fluorescent lubricant contacts, and an inspection area to check whether or not the first gas-liquid interface is located within a predetermined range.

3. The disk drive device according to claim 1, wherein the first gas-liquid interface emits, when irradiated with predetermined input light, output light with a wavelength different from a wavelength of the input light.

4. The disk drive device according to claim 1, wherein the first gas-liquid interface emits blue or green light when irradiated with ultraviolet rays.

5. The disk drive device according to claim 1, wherein a boiling point of the luminous substance is higher than a boiling point of water.

6. The disk drive device according to claim 1, wherein the fluorescent lubricant contains an ionic solution.

7. The disk drive device according to claim 1, wherein:
the luminous substance is a nonorganic substance or an organic substance;
the nonorganic substance includes at least one of a rare-earth salt, a uranyl salt, a platinum cyan complex salt, and a tungsten acid salt; and
the organic substance includes at least one of benzene, aniline, anthracene, a phthalein-based pigment, a porphyrin-based pigment, and a cyan-based pigment.

8. A disk drive device comprising:
a rotating body including a hub on which a recording disk is mountable, and a sleeve;
a stationary body including a chassis and a shaft assembly, the shaft assembly including a shaft that is inserted in the sleeve, a first flange that is provided at a first-end-side portion of the shaft, a second flange that is provided at a second-end-side portion of the shaft, and a flange encircling part that protrudes from the second flange toward the hub so as to encircle a part of the sleeve, wherein the chassis supports the shaft assembly;
a first capillary seal which is formed in a gap between an outer circumference of the first flange and the hub, and which is opened toward an external space in an axial direction of the disk drive device, wherein a first gas-liquid interface is present in the first capillary seal;
a second capillary seal which is formed between the sleeve and the flange encircling part, and which is opened toward the first capillary seal in the axial direction;
a fluorescent lubricant which is applied between the stationary body and the rotating body from the first capillary seal to the second capillary seal, and which is a synthetic oil that contains an ester-based compound as a primary element, wherein the synthetic oil contains a luminous substance at a rate of at least 0.001 mass % to at most 1 mass %;
a cap which at least partially covers an opening of the first capillary seal, and is provided in a non-contact manner with the fluorescent lubricant; and
a protrusion which protrudes from the chassis toward the hub along the flange encircling part, at least partially covers an opening of the second capillary seal, and is provided in a non-contact manner with the fluorescent lubricant.

9. The disk drive device according to claim 8, wherein the gap between the outer circumference of the first flange and the hub includes a contact area with which the fluorescent lubricant contacts, and an inspection area to check whether or not the first gas-liquid interface is located within a predetermined range.

10. The disk drive device according to claim 8, wherein the first gas-liquid interface emits, when irradiated with predetermined input light, output light with a wavelength different from a wavelength of the input light.

11. The disk drive device according to claim 8, wherein the first gas-liquid interface emits blue or green light when irradiated with ultraviolet rays.

12. A disk drive device comprising:
a rotating body including a hub on which a recording disk is mountable, and a sleeve;
a stationary body including a chassis and a shaft assembly, the shaft assembly including a shaft that is inserted in the sleeve, a first flange that is provided at a first-end-side portion of the shaft, a second flange that is provided at a second-end-side portion of the shaft, and a flange encircling part that protrudes from the second flange toward the hub so as to encircle a part of the sleeve, wherein the chassis supports the shaft assembly;
a first capillary seal which is formed in a gap between an outer circumference of the first flange and the hub, and which is opened toward an external space in an axial direction of the disk drive device, wherein a first gas-liquid interface is present in the first capillary seal;
a second capillary seal which is formed between the sleeve and the flange encircling part, and which is opened toward the first capillary seal in the axial direction;
a fluorescent lubricant which is applied between the stationary body and the rotating body from the first capillary seal to the second capillary seal, and which is a synthetic oil that contains an ester-based compound as a primary element, wherein the synthetic oil contains a luminous substance at a rate of at least 0.001 mass % to at most 1 mass %; and
a cap which at least partially covers an opening of the first capillary seal, and is provided in a non-contact manner with the fluorescent lubricant.

13. The disk drive device according to claim 12, wherein the gap between the outer circumference of the first flange and the hub includes a contact area with which the fluorescent lubricant contacts, and an inspection area to check whether or not the first gas-liquid interface is located within a predetermined range.

14. The disk drive device according to claim 12, wherein the first gas-liquid interface emits, when irradiated with predetermined input light, output light with a wavelength different from a wavelength of the input light.

15. The disk drive device according to claim 12, wherein the first gas-liquid interface emits blue or green light when irradiated with ultraviolet rays.

* * * * *